United States Patent
Khayrallah

(10) Patent No.: US 8,279,981 B2
(45) Date of Patent: Oct. 2, 2012

(54) METHOD FOR POST DETECTION IMPROVEMENT IN MIMO

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 435 days.

(21) Appl. No.: 12/604,570

(22) Filed: Oct. 23, 2009

(65) Prior Publication Data
US 2011/0096873 A1   Apr. 28, 2011

(51) Int. Cl.
*H04L 27/06* (2006.01)
(52) U.S. Cl. .......................... 375/340; 375/148
(58) Field of Classification Search ............ 375/316, 375/340, 347, 267, 350, 148; 455/67.13
See application file for complete search history.

(56) References Cited

U.S. PATENT DOCUMENTS

| | | | |
|---|---|---|---|
| 2006/0209977 A1* | 9/2006 | Graef et al. | 375/261 |
| 2006/0268963 A1* | 11/2006 | Yoshida | 375/148 |
| 2007/0291882 A1* | 12/2007 | Park et al. | 375/347 |
| 2010/0189169 A1* | 7/2010 | Eleftheriou et al. | 375/231 |
| 2011/0268019 A1* | 11/2011 | Tang et al. | 370/328 |

* cited by examiner

*Primary Examiner* — Aristocratis Fotakis

(57) ABSTRACT

A two-stage approach to MIMO detection improves receiver performance in a computationally tractable manner. A whitening joint detector processes a MIMO symbol stream. The whitening joint detector includes a pre-filter operative to suppress a first subset of the received MIMO streams as colored noise. The whitening joint detector further includes a primary joint detector operative to process a second subset of the MIMO streams and to output a preliminary solution obtained by minimizing a whitening joint detection metric. A secondary detector then operates in the vicinity of the primary joint detector preliminary solution. The secondary detector improves the preliminary solution by comparison to a full joint detection metric.

8 Claims, 2 Drawing Sheets

METHOD FOR POST DETECTION IMPROVEMENT IN MIMO

FIELD OF INVENTION

The present invention relates generally to wireless communications, and in particular to an improved MIMO joint detection receiver.

BACKGROUND

Multiple Input, Multiple Output (MIMO) is a communication technology in which multiple transmit antennas are utilized at a transmitter, and also multiple receive antennas are utilized at a receiver. MIMO technology offers increased data throughput and range, without requiring additional bandwidth or transmit power. It achieves this by higher spectral efficiency and link diversity.

In one type of MIMO technology, N streams of symbols are transmitted at the same time. Each symbol is received at each receiver antenna. A joint detector receiver is a known technique to recover the transmitted symbols. For N symbols, all from the same constellation Q of size q, the joint detection receiver has $q^N$ possibilities to assess. For q=64 and four transmit and receive antennas, this yields $64^4$, or 16,777,216 possibilities. At high data rates, a full joint detection receiver becomes computationally explosive, and impractical to implement.

SUMMARY

According to one or more embodiments disclosed and claimed herein, a two-stage approach to MIMO detection improves receiver performance in a computationally tractable manner. A whitening joint detector processes a MIMO symbol stream. The whitening joint detector includes a pre-filter operative to suppress a first subset of the received MIMO streams as colored noise. The whitening joint detector further includes a primary joint detector operative to process a second subset of the MIMO streams and to output a preliminary solution obtained by minimizing a whitening joint detection metric. A secondary detector then operates in the vicinity of the primary joint detector preliminary solution. The secondary detector improves the preliminary solution by comparison to a full joint detection metric.

DETAILED DESCRIPTION

In an N×N MIMO scenario over a non-dispersive channel, a received signal may be modeled as $$r=Hs+n \quad (1)$$

where r is the received signal, s is the transmitted signal, n is noise, and H summarizes the transmission channel. Here r, s and n are N×1 vectors, and H is a N×N matrix. The components of H are independent and Rayleigh faded. By default, n is white Gaussian noise with covariance $R_n = \sigma^2 I$. All N signals are from the same constellation Q of size q, and all N signals are transmitted with the same power. The effective constellation for s is of size $q^N$.

A full joint detection receiver for s searches over all $q^N$ candidates ŝ for one that minimizes the squared distance $$m_{JD}(\hat{s}) = (r - H\hat{s})^H (r - H\hat{s}) \quad (2)$$

The solution is denoted $\hat{s}_{JD}$. The full joint detection receiver is computationally complex, and may be impractical to implement for large constellations and high data rates.

Figure 1:
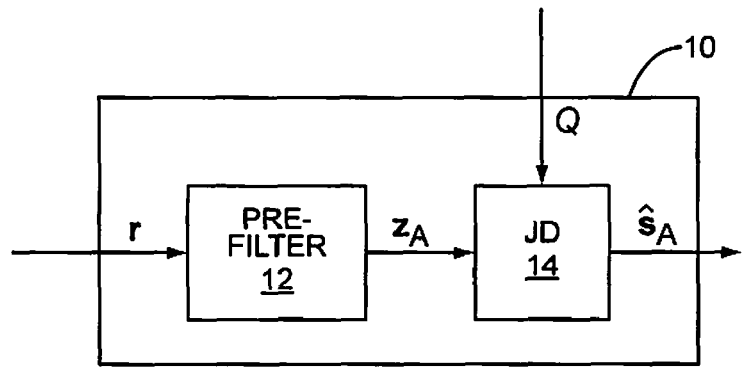
FIG. 1 is a functional block diagram of a whitening joint detector comprising a pre-filter and a joint detector using a whitening joint detection metric.

FIG. 1 depicts a whitening joint detection portion of a receiver 10. In the whitening joint detector 10, the task is simplified by modifying a joint detection receiver 14 to jointly detect only a set A, containing $N_A$ out of N signals, and treat the remaining set B, containing the other $N_B = N - N_A$ signals, as interference. The signals in set B are modeled as colored noise, and suppressed by a whitening pre-filter 12.

Without loss of generality, assume that A occupies the top of s, and B occupies its bottom. Other cases follow similarly. Thus, $$s = \begin{bmatrix} s_A \\ s_B \end{bmatrix} \quad (3)$$

$$H = [H_A, H_B], \text{ and} \quad (4)$$

$$r = H_A s_A + H_B s_B + n = H_A s_A + u \quad (5)$$

where $H_A$ is a N×$N_A$ matrix, $H_B$ is a N×$N_B$ matrix, $s_A$ is a $N_A$×1 vector, $s_B$ is a $N_B$×1 vector, and u is a N×1 vector.

We model u as a colored noise. We assume that the transmitted symbols have zero mean. This is the case for most well-known constellations. Then $s_B$ has zero mean, and consequently so does $H_B s_B$. In addition, $H_B s_B$ has covariance $$R_B = H_B H_B^H E_B \quad (6)$$

Where $E_B$ is the average symbol energy in $s_B$. Thus, u has zero mean and covariance $$R_u = R_B + R_n \quad (7)$$

With the colored noise model, the whitening joint detector for A searches over all $q^{N_A}$ candidates $\hat{s}_A$ for one that minimizes the metric $$(r - H_A \hat{s}_A)^H R_u^{-1} (r - H_A \hat{s}_A) = r^H R_u^{-1} r - 2Re\{\hat{s}_A^H H_A^H R_u^{-1} r\} + \hat{s}_A^H H_A^H R_u^{-1} H_A \hat{s}_A \quad (8)$$

We can manipulate equation (8) to identify a pre-filter 12, the output of which is the input to a joint detector 14. We define the N×$N_A$ matrix $$W = R_u^{-1} H_A \quad (9)$$

as the pre-filter 12. Its output is the $N_A$×1 vector $$z_A = W^H r \quad (10)$$

The first term of equation (8) does not depend on $\hat{s}_A$, and may be dropped. The two remaining terms are identified as $$m_{WJD}(\hat{s}_A) = -2Re\{\hat{s}_A^H z_A\} + \hat{s}_A^H H_A^H R_u^{-1} H_A \hat{s}_A \quad (11)$$

which is used as the metric of the whitening joint detector.

The pre-filter 12 collects the energy of the desired signal in A while suppressing the other signals in B as interference.

Figure 2:
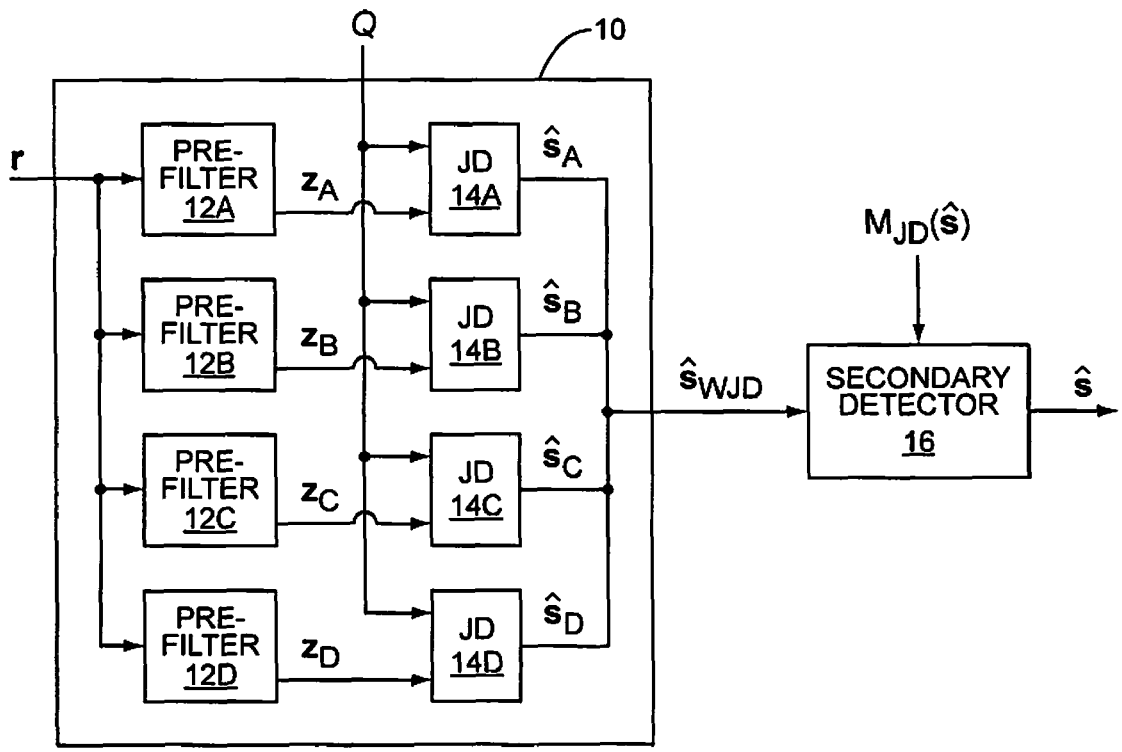
FIG. 2 is a functional block diagram of a whitening joint detector comprising parallel pre-filter and joint detector legs, each processing a different subset of MIMO streams.

Multiple whitening joint detectors 10 may be deployed in parallel to handle the N streams. For example, with N=4 streams, two whitening joint detectors may each process two streams. Alternatively, FIG. 2 depicts four whitening joint detectors, each processing a single stream (A, B, C, and D). The total solution with N symbols is denoted $\tilde{s}_{WJD}$.

Multiple, parallel whitening joint detectors 10 require less complexity than a full joint detector; however, the whitening joint detector 10 has worse performance. To recover some of the performance loss, a secondary detector 16 is employed. The secondary detector 16 searches for a better solution in the vicinity of the primary detector 14 solution. The secondary detector 16 uses a better metric. Specifically, here each primary detector 14 uses the whitening joint detector metric in equation (11). The secondary detector 16 uses the full joint detector metric in equation (2). The local search set of the secondary detector 16 consists of nearest neighbors, as explained herein.

In addition, the local search in the secondary detector 16 is well suited for generating modem bit soft values. We show how this can be made simple by identifying for each bit of each symbol, a designated companion symbol that is used in the soft value generation.

Assuming that the primary detector 10 has produced its solution $\tilde{s}_{WJD}$, as depicted in FIG. 2, the full joint detection metric is computed:

$$m_{JD}(\tilde{s}_{WJD}) = (r - H\tilde{s}_{WJD})^H (r - H\tilde{s}_{WJD}) \quad (12)$$

This full joint detection metric was not computed in the primary detector(s) 14, which use the whitening joint detection metric.

The secondary detector 16 attempts to beat the metric in equation (12). That is, if a candidate vector $\acute{s}$ is found, whose joint detection metric is smaller than $m_{JD}(\tilde{s}_{WJD})$ then $\tilde{s}$ is a better solution in a joint detection sense, and should replace $\tilde{s}_{WJD}$ output by the primary detector 10.

A nearest neighbor is a symbol at the smallest Euclidean distance from a given symbol. First note that from the perspective of the joint detector, in principle the nearest neighbors should be in the "receive domain." That is, the effect of the channel H should be considered, and the nearest neighbors of $H\tilde{s}_{WJD}$ used. However, finding nearest neighbors is a highly complex operation. Also, since H changes with time, the operation must be repeated often. As a result, a more manageable nearest neighbor procedure is required.

In one embodiment, nearest neighbors are found in the "transmit domain." That is, the effect of the channel is ignored, and the neighbors of $\tilde{s}_{WJD}$ are considered. Furthermore, the nearest neighbors of the N individual symbols $\tilde{s}_{WJD}(i)$ of $\tilde{s}_{WJD}$ may be considered. This greatly simplifies the search for nearest neighbors. The nearest neighbor set of a symbol value s is denoted T(s).

Note that by ignoring the effect of channel H, valuable information is lost. A nearest neighbor in the transmit domain is not necessarily a nearest neighbor in the receive domain. Nevertheless, it is a simplifying approximation that yields good results in an average sense.

Figure 3:
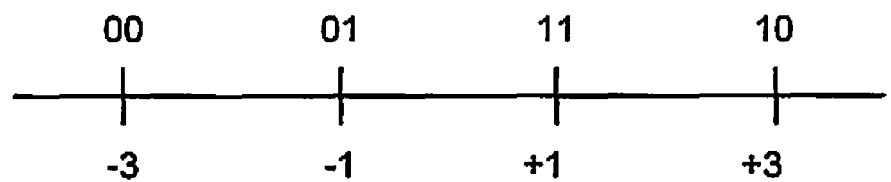
FIG. 3 is a representative depiction of a 4-ASK symbol constellation, and the associated Gray codes.

FIG. 3 depicts a map from modem bits to symbols in a four-level amplitude-shift keying (4-ASK) modulation scheme. The map depicted in FIG. 3 is a Gray map. The two inner symbols each have two nearest neighbors, and the two outer symbols each have one nearest neighbor.

A popular map for quadrature amplitude modulation (QAM) is defined per ASK component. That is, for 16-QAM, the 4-bit map is defined as two 2-bit Gray maps on the 4-ASK components. In this scheme, the four inner symbols each have four nearest neighbors. The four corner symbols each have two nearest neighbors. The remaining eight outer symbols each have three nearest neighbors.

Similarly, for 64-QAM, the 6-bit map is defined as two 3-bit Gray maps on the 8-ASK components. The 36 inner symbols each have four nearest neighbors. The four corner symbols each have two nearest neighbors. The remaining 24 outer symbols each have three nearest neighbors.

In one embodiment, the secondary detector 16 implements a basic search that cycles through all N symbols, one symbol at a time, and considers each one of each symbol's nearest neighbors. If the best symbol vector has changed, then it cycles through the N symbols again. The search stops if the best symbol vector does not change after a full cycle, indicating no further improvement is achievable. The search may also have an overall limit on the number of cycles performed.

More specifically, the initial conditions are $\bar{s}=\tilde{s}_{WJD}$, the output of the primary joint detector 14, and $\bar{m}=m_{JD}(\tilde{s}_{WJD})$, the full joint detection metric using that output (as opposed to the whitening joint detection metric used by the primary joint detector 14). Without much loss of generality, we start with the first symbol $\bar{s}(1)$, and we test all the symbols in $T(\bar{s}(1))$. That is, the full joint detection metric is computed for a candidate $\hat{s}$, which is equal to $\bar{s}$, except that symbol $\bar{s}(1)$ is replaced by a nearest neighbor from $T(\bar{s}(1))$. If $$m_{JD}(\hat{s}) < \bar{m} \quad (13)$$

then $\bar{s}=\hat{s}$ and $\bar{m}=m_{JD}(\hat{s})$.

The search then proceeds over $T(\bar{s}(2))$, and so on. After searching through $T(\bar{s}(N))$, the cycle is complete. If $\bar{s}$ has changed from the value at the beginning of the cycle, indicating some improvement in the solution, then another cycle is performed. If $\bar{s}$ has not changed, the last cycle's output is the best solution achievable and the process terminates. The secondary detector 16 may also check against a predetermined limit to the number of cycles performed.

The search terminates with a solution $\bar{s}$. If $\bar{s} \neq \tilde{s}_{WJD}$, then by construction $\bar{m} < m_{JD}(\tilde{s}_{WJD})$, and the secondary detector 16 has found a better solution in the joint detector metric sense. If $\bar{s}=\tilde{s}_{WJD}$ then the secondary detector 16 did not improve on the solution by the primary detector 14.

In one embodiment, the secondary detector 16 implements an advanced search that changes more than one symbol at a time. Sets are defined as $$U(\bar{s}(i)) = T(\bar{s}(i)) \cup \{\bar{s}(i)\} \quad (14)$$

The number L>1 of symbols that are changed simultaneously is a design parameter. The initial conditions are the same as in the basic search embodiment: $\bar{s}=\tilde{s}_{WJD}$ and $\bar{m}=m_{JD}(\tilde{s}_{WJD})$.

Without much loss of generality, the first L symbols are searched simultaneously, using $U(\bar{s}(1)), \ldots, U(\bar{s}(L))$. That is, a candidates $\hat{s}$ is formed by starting with $\bar{s}$, and replacing the first L symbols with symbols from $U(\bar{s}(1)), \ldots, U(\bar{s}(L))$. Note that including $\bar{s}(i)$ in $U(\bar{s}(i))$ means that the cases are considered where fewer than L symbols are actually changed. As with the basic search embodiment, $\bar{s}=\hat{s}$ and $\bar{m}=m_{JD}(\hat{s})$ if $m_{JD}(\hat{s}) < \bar{m}$.

The search the proceeds over the next L symbols, and so on, until all symbols are exhausted. The last search may be over fewer than L symbols, if N is not a multiple of L. Increasing L makes the search more thorough, and also more complex. The value L=N means all symbols are searched at once.

The search procedure may be generalized further by overlapping the successive groups of L symbols. For instance, assuming L is an even number, after the first L symbols are considered, the next L symbols to be considered consist of the second half of the first L symbols and the next L/2 symbols, and so on. The benefit of overlap is that more potential candidates are included in the search. There is a corresponding increase in complexity.

Modem bit soft values can be exploited by a subsequent decoder to boost overall performance. However, the generation of soft values can represent additional complexity when added to a primary joint detector 14. In one embodiment, soft values are generated and output by the secondary detector 16.

Without much loss of generality, consider a constellation with $2^J$ symbols. Let $b_1 \ldots b_J$ denote the J bits mapping into a symbol s. In order to describe the soft values, it is convenient to define the bit nearest neighbor (BNN). For bit $b_j$, the BNN $s_j'$ is the closest symbol in the constellation with $b_j$ flipped. If two symbols satisfy the BNN requirement, one is selected such that the BNN is unique. Note no condition is imposed on the remaining J−1 bits, which may or may not change. Note also that the BNN's can be computed off-line, from the constellation and the bit map.

Referring again to the 4-ASK with Gray map of FIG. 3, for For s=−3 with $b_1 b_2$=00, $s_1'$=+1 and $s_2'$=−1. For s=−1 with $b_1 b_2$=01, $s_1'$=+1 and $s_2'$=−3, etc.

Figure 4:
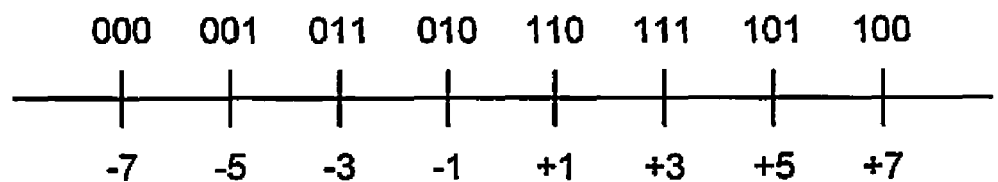
FIG. 4 is a representative depiction of an 8-ASK symbol constellation, and the associated Gray codes.

As another example, FIG. 4 depicts an 8-ASK with a gray map. In this case, for s=−7 with $b_1 b_2 b_3$=000, $s_1'$=+1, $s_2'$=−3, and $s_3'$=−5. For s=−1 with $b_1 b_2 b_3$=001, $s_1'$=+1, $s_2'$=−3, and $s_3'$=−7, etc.

The solution output by the secondary detector 16 is $\bar{s}$ with full joint detection metric $\bar{m}$. For bit j in symbol $\bar{s}(i)$ in $\bar{s}$, a symbol vector $\bar{s}'$, is constructed, wherein the symbol $\bar{s}(i)$ is replaced by the appropriate BNN, and other symbols are unchanged. The full joint detection metric $m_{JD}(\bar{s}')$ is computed. The soft value for bit j in symbol i is given by $$\lambda = |m_{JD}(\bar{s}') - \bar{m}| \quad (15)$$

Overall, the soft value generation is similar to the basic search described earlier, with the nearest neighbor sets replaced with the BNN's.

Also, as is the case in the ASK example above, $\bar{s}'$ may already be in the nearest neighbor set, so $m_{JD}(\bar{s}')$ would have already been computed in the secondary detector 16. In this case, there is no need to compute it again for the soft value generation.

In one embodiment, the nearest neighbor symbol set is defined so as to include not only the nearest neighbors as defined above but also the next nearest neighbors, defined as symbols that differ from a given symbol by the next smallest distance. The definition of next nearest neighbor symbol may be thus expanded as desired or required.

In a large constellation, the relaxed nearest neighbor set would still be small in comparison to the constellation. In general, relaxing the nearest neighbor sets enables a wider search in the secondary detector 16, increasing the chance to identify the true joint detector solution. Of course, this is done at the price of higher complexity.

Embodiments of the secondary detector 16 described above use the full joint detector metric and attempt to identify the joint detector solution. In one embodiment, a secondary detector 16 performs its search over a larger number of MIMO streams than the primary detector(s) 14, and use the corresponding whitening joint detection metric. This helps reduce the complexity of the secondary detector 16, at the expense of a smaller performance boost. For example, in one embodiment with eight MIMO streams, each primary detector 14 processes 2 streams jointly, and the secondary detector 16 processes four streams jointly.

Multi-stage arbitration (MSA) is an attractive demodulation structure suited for MIMO and multi-carrier scenarios. MSA is described in co-pending U.S. patent application Ser. No. 12/568,036, titled "Nonlinear Equalization and MIMO Demodulation Using Multistage Arbitration (MSA)," by G. E. Bottomley and Y.-P. E. Wang, filed Sep. 28, 2009, assigned to the assignee of the present application, the disclosure of which is incorporated herein by reference in its entirety. The general idea in MSA is to sift through a large set of candidates in multiple stages, where each stage rejects some candidates, until a single candidate is left after the final stage. In a multi-stream scenario such as MIMO or multi-code transmission, MSA increases the number of streams processed jointly in consecutive stages. That is, in the first stage, each stream may be processed individually by a single detector. Pairs of streams may then be processed together by a joint detector in the second stage, and so on. This keeps complexity from exploding, while mimicking the behavior of a true joint detector over all streams.

In one embodiment, an entire MSA receiver is treated as a primary detector, and a secondary detector 16 as described herein improves on the MSA solution. Improvement is possible since the MSA does not search exhaustively for all possible symbol combinations. The secondary detector 16 is also advantageous for soft value generation for MSA.

Serial localization with indecision (SLI) is a multi-stage detector, proposed as a low-complexity alternative to a MSA. SLI receivers are disclosed in co-pending U.S. patent application Ser. No. 12/549,132, titled "Method for Demodulation Using Serial Localization with Indecision (SLI)," by A. Khayrallah, filed Aug. 27, 2009, assigned to the assignee of the present application, the disclosure of which is incorporated herein by reference in its entirety. The use of joint detection with a SLI receiver is disclosed in co-pending U.S. patent application Ser. No. 12/549,157, titled "Method for Joint Demodulation and Interference Suppression Using Serial Localization with Indecision (SLI)," by A. Khayrallah, filed Aug. 27, 2009, also assigned to the assignee of the present application, the disclosure of which is also incorporated herein by reference in its entirety. The indecision feature of SLI derives from the key factor of representing the modulation constellation with overlapping subsets. Indecision is beneficial in a multi-stage structure, because it discourages an irreversible bad decision in an early stage.

As explained in the above-referenced patent applications, a SLI block represents a subset of constellation symbols by its centroid, and treats the set of centroids as its own constellation. By detecting a certain centroid, the SLI block is effectively localizing the search, since the next stage will focus on the subset associated with that centroid.

In one embodiment, as with the MSA, an entire SLI receiver is treated as a primary detector, and a secondary detector 16 as described herein improves on the SLI solution. Improvement is possible since the SLI does not search exhaustively for all possible symbol combinations. The secondary detector 16 is also advantageous for soft value generation for SLI.

A secondary detector 16 according to any embodiment described herein is a suitable second stage to follow a primary detector that either does not conduct an exhaustive search, does not use the full joint detection metric, or both. The secondary detector 16 also provides a convenient mechanism for soft value generation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A receiver operative in a multiple input, multiple output (MIMO) wireless communication network in which two or more MIMO streams of communication symbols are received, comprising:
   a first whitening joint detector comprising
      a pre-filter operative to suppress a first subset of the received MIMO streams as colored noise; and
      a primary joint detector operative to process a second subset of the MIMO streams and to output a preliminary solution obtained by minimizing a whitening joint detection metric;
   a second whitening joint detector operating in parallel with the first whitening joint detector, the second whitening joint detector operative to suppress the second subset of the MIMO streams as colored noise and to process the first subset of the MIMO streams; and
   a secondary detector operating in the vicinity of the primary joint detector preliminary solution, and operative to improve the preliminary solution by comparison to a full joint detection metric.

2. The receiver of claim 1 further comprising a third whitening joint detector operating in parallel with the first and second whitening joint detectors, wherein each whitening joint detector processes a different subset of the MIMO streams and suppresses all other subsets of the MIMO streams as colored noise.

3. A receiver operative in a multiple input, multiple output (MIMO) wireless communication network in which two or more MIMO streams of communication symbols are received, comprising:
   a first whitening joint detector comprising
      a pre-filter operative to suppress a first subset of the received MIMO streams as colored noise; and
      a primary joint detector operative to process a second subset of the MIMO streams and to output a preliminary solution obtained by minimizing a whitening joint detection metric; and
   a secondary detector operating in the vicinity of the primary joint detector preliminary solution, and operative to improve the preliminary solution by comparison to a full joint detection metric, wherein the secondary detector operating in the vicinity of the primary joint detector preliminary solution and operative to improve the preliminary solution by comparison to a full joint detection metric is operative to:
   compute the full joint detection metric on the preliminary solution output by the primary joint detector;
   take the full joint detection metric on the preliminary solution as a tentative secondary solution;
   iteratively compute the full joint detection metric on a plurality of vectors of nearest neighbors to symbols found in the primary joint detector preliminary solution; and
   at each iteration, if the full joint detection metric of a vector of nearest neighbors is less than the tentative secondary solution, substitute the metric as a new tentative secondary solution; and
   repeat iterations until one of no improvement in the metric over a last tentative secondary solution, or an iteration count is reached; and
   take the last tentative secondary solution as the output of the secondary detector, wherein iteratively computing the full joint detection metric on the plurality of vectors of nearest neighbors to symbols found in the primary joint detector preliminary solution comprises computing $m_{JD}(\hat{s})=(r-H\hat{s})^H(r-H\hat{s})$ where r is the received signal;
   H is the channel; and
   $\hat{s}$ is a vector of nearest neighbors to symbols found in the primary joint detector preliminary solution.

4. The receiver of claim 3 wherein, at each iteration, $\hat{s}$ is a vector in which the nearest neighbors to one symbol at a time are changed with respect to the prior iteration.

5. The receiver of claim 3 wherein, at each iteration, $\hat{s}$ is a vector in which the nearest neighbors to L>1 symbol at a time are changed with respect to the prior iteration.

6. A method of detecting communication symbols in a multiple input, multiple output (MIMO) wireless communication network in which two or more MIMO streams of communication symbols are received, comprising:
   suppressing a first subset of the received MIMO streams as colored noise; and
   jointly detecting a second subset of the MIMO streams in a first primary detector and outputting a preliminary solution obtained by minimizing a whitening joint detection metric; and
   jointly detecting the second subset of the MIMO streams in a secondary detector operating in the vicinity of the primary joint detector preliminary solution, and improving the preliminary solution by comparison to a full joint detection metric, further comprising the steps of, in the secondary detector:
   computing the full joint detection metric on the preliminary solution output by the primary joint detector;
   taking the full joint detection metric on the preliminary solution as a tentative secondary solution;
   iteratively computing the full joint detection metric on a plurality of vectors of nearest neighbors to symbols found in the primary joint detector preliminary solution; and
   at each iteration, if the full joint detection metric of a vector of nearest neighbors is less than the tentative secondary solution, substituting the metric as a new tentative secondary solution; and
   repeating iterations until one of no improvement in the metric over the last tentative secondary solution, or an iteration count is reached; and
   taking a last tentative secondary solution as the output of the secondary detector,
   wherein iteratively computing the full joint detection metric on the plurality of vectors of nearest neighbors to symbols found in the primary joint detector preliminary solution comprises computing $m_{JD}(\hat{s})=(r-H\hat{s})^H(r-H\hat{s})$ where r is the received signal;
   H is the channel; and
   $\hat{s}$ is a vector of nearest neighbors to symbols found in the primary joint detector preliminary solution.

7. The method of claim 6 further comprising changing the nearest neighbors in the vector $\hat{s}$ near one symbol at a time at each iteration, as compared to the prior iteration.

8. The method of claim 7 further comprising changing the nearest neighbors in the vector $\hat{s}$ near L>1 symbols at a time at each iteration, as compared to the prior iteration.

* * * * *

UNITED STATES PATENT AND TRADEMARK OFFICE
CERTIFICATE OF CORRECTION

PATENT NO. : 8,279,981 B2  Page 1 of 1
APPLICATION NO. : 12/604570
DATED : October 2, 2012
INVENTOR(S) : Khayrallah It is certified that error appears in the above-identified patent and that said Letters Patent is hereby corrected as shown below:

In Column 3, Line 31, delete " $\acute{s}$ " and insert -- $\hat{s}$ --, therefor.

In Column 3, Line 32, delete " $\tilde{s}$ " and insert -- $\hat{s}$ --, therefor.

In Column 4, Line 25, delete " $\bar{s}=\bar{s}$ " and insert -- $\widetilde{s} = \hat{s}$ --, therefor.

In Column 5, Line 17, delete " For s=-3" and insert -- s=-3 --, therefor.

In Column 5, Line 23, delete " $\bar{s}$ " and insert -- $\widetilde{s}$ , --, therefor.

In Column 5, Line 30, in Equation (15), delete " $\lambda=|m_{JD}(\bar{s}')-\bar{m}|(15)$ " and insert -- $\lambda=|m_{JD}(\bar{s}')-\bar{m}|$  (15) --, therefor.

Signed and Sealed this
Eleventh Day of December, 2012

David J. Kappos
*Director of the United States Patent and Trademark Office*